(12) United States Patent
Schleyer et al.

(10) Patent No.: US 11,073,208 B2
(45) Date of Patent: Jul. 27, 2021

(54) HYDROSTATIC TRACTION DRIVE, MOBILE WORKING MACHINE HAVING THE TRACTION DRIVE, AND METHOD FOR SUPPLYING DATA

(71) Applicant: Robert Bosch GmbH, Stuttgart (DE)

(72) Inventors: Markus Schleyer, Ludwigsburg (DE); Steffen Mutschler, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/599,726

(22) Filed: Oct. 11, 2019

(65) Prior Publication Data
US 2020/0116252 A1 Apr. 16, 2020

(30) Foreign Application Priority Data
Oct. 15, 2018 (DE) .............. 10 2018 217 566.7

(51) Int. Cl.
| | |
|---|---|
| *F16H 61/02* | (2006.01) |
| *F16H 61/42* | (2010.01) |
| *F16H 61/40* | (2010.01) |
| *F16H 59/44* | (2006.01) |
| *F16H 59/46* | (2006.01) |
| *B60W 40/09* | (2012.01) |
| *F16H 59/68* | (2006.01) |

(52) U.S. Cl.
CPC ......... *F16H 61/0202* (2013.01); *B60W 40/09* (2013.01); *F16H 61/40* (2013.01); *F16H 2059/6838* (2013.01)

(58) Field of Classification Search
CPC ............. F16H 61/0202; F16H 61/42; F16H 61/421–439; F16H 61/40; F16H 2059/6838; F16H 2059/462; B60W 40/09
See application file for complete search history.

(56) References Cited

U.S. PATENT DOCUMENTS

| | | | |
|---|---|---|---|
| 2016/0312888 A1* | 10/2016 | Schmuttermair | ....... F16H 61/42 |
| 2018/0195605 A1* | 7/2018 | Hernandez Ladera | ...................... F16H 61/47 |
| 2019/0032779 A1* | 1/2019 | Wogrin | ................... F16H 61/70 |
| 2019/0178375 A1* | 6/2019 | Giorgio Bort | ........ F16H 61/475 |

* cited by examiner

*Primary Examiner* — Tisha D Lewis
(74) *Attorney, Agent, or Firm* — Maginot, Moore & Beck LLP (57) ABSTRACT

A hydrostatic traction drive for a mobile working machine includes a first hydraulic machine coupled to a drive machine, a second hydraulic machine arranged with the first hydraulic machine in a hydraulic circuit and coupled to an output, and an electronic control device. A characteristic diagram of a setpoint driving behavior of the mobile working machine is stored in the electronic control device and is parameterized at least in accordance with at least one driving request.

15 Claims, 6 Drawing Sheets

HYDROSTATIC TRACTION DRIVE, MOBILE WORKING MACHINE HAVING THE TRACTION DRIVE, AND METHOD FOR SUPPLYING DATA

This application claims priority under 35 U.S.C. § 119 to patent application no. DE 10 2018 217 566.7, filed on Oct. 15, 2018 in Germany, the disclosure of which is incorporated herein by reference in its entirety.

BACKGROUND

A hydrostatic traction drive of a mobile working machine has a hydrostatic transmission with hydraulic machines which are arranged in a hydraulic circuit and which are actuated in different ways depending on a driver's request, for example the position of an accelerator pedal. If the traction drive comprises a working machine which is coupled to the hydraulic machines, for example an internal combustion engine or electric motor, it is generally also possible to actuate these in order to fulfil the driver's request. A position of the accelerator pedal can be interpreted here as a setpoint value of various physical variables of the traction drive and of the working machine. For example as a setpoint speed, as a setpoint traction force or as a setpoint traction torque or as a mixture of both. How the position is to be interpreted and how the traction drive and therefore the working machine are to subsequently "behave", is described by parameterizing a characteristic setpoint variable in accordance with the driver's request (pedal position) and if appropriate the speed and is stored as a characteristic diagram in a control device of the traction drive.

Different types of mobile working machines, for example wheel loaders, teleloaders, stackers, sweeping machines, etc. as well as different models of the same type have different power classes and speed ranges. That is to say they differ, in particular, with respect to the maximum vehicle speed and maximum available power. The specified variables are limited here essentially by the drive machine. Since the parameterization depends both on properties which are type/model specific and properties which are driving-behavior-specific, once driving behavior has been found to be good it is virtually impossible, or possible only at considerable cost, to transfer it to another type or another model. The different properties of the types/models have to be allowed for by type-specific or model-specific parameterization, which has to take place largely separately for each individual type or each individual model. This constitutes a considerable cost in terms of parameterization.

SUMMARY

In contrast to the above, the disclosure is based on the object of providing a hydrostatic traction drive which can be parameterized at low cost beyond the boundaries of types and/or models. A further object is to provide a mobile working machine having the hydrostatic traction drive and a method for supplying data to the hydrostatic traction drive.

A hydrostatic traction drive for a mobile working machine which is, for example, a wheel loader, teleloader or front loader, has two hydraulic machines or hydraulic machine units which are arranged in a hydraulic circuit. One of these is or can be coupled to a working machine, for example a diesel engine or electric motor, and the other of the two is or can be coupled to an output, in particular an output axle or a wheel. In order to control, in particular, the specified drive machines and/or hydraulic machines according to a setpoint driving behavior, the traction drive has an electronic control device in which the characteristic diagram of the setpoint driving behavior of the traction drive or of the mobile working machine is or can be stored, having been parameterized at least in accordance with a driving request. According to the disclosure, this characteristic diagram is provided in the control device, in such a way that it is stored or can at least be stored after having been standardized to at least one, in particular, fixed characteristic or property of the traction drive or of the mobile working machine.

As a result of the standardization according to the disclosure, the driving behavior which is described by the characteristic diagram is divided or can be divided into working-machine-specific characteristics and driving-behavior-specific characteristics so that the driving behavior can be transferred with less cost to other types of working machines or models of a type. The cost of parameterization of the other model and/or type therefore drops.

In one development, the characteristic diagram of the setpoint driving behavior can or is additionally stored having been parameterized in accordance with a speed, in particular of the traction drive or of the mobile working machine.

In one development, this speed is or can in turn be stored having been standardized to a suitable, in particular fixed, characteristic of the working machine, in particular to a maximum speed of the traction drive or of the mobile working machine. The greater the number of variables of the characteristic diagram which are stored in a standardized fashion—and in this way, in particular, in a dimensionless fashion, the lower the subsequent parameterization cost when transferring the driving behavior to the other type or the other model.

In one development, the traction drive has a speed-sensing device by means of which the speed or a variable dependent thereon, for example a rotational speed, from which the speed can be acquired by means of the control device, can be sensed.

In one development, the driving request is a value or a position of an operating interface of the traction drive, in particular of an accelerator pedal or driving joystick of the traction drive. The driver request can, however, also be composed of the requests of a plurality of operating interfaces, for example of the accelerator pedal, of a brake pedal, of a travel direction switch or other operating interfaces which are explained in the following description of the figures.

Accordingly, the traction drive preferably has such operating interfaces for sensing the respective driving request. In one development, the setpoint driving behavior is mapped by the characteristic diagram of a setpoint traction force of the traction drive or of the working machine. The at least one, in particular fixed, characteristic is then a maximum traction force, described, in particular, in a speed-dependent fashion, in particular of the traction drive or of the mobile working machine.

In one development, this maximum traction force is stored in accordance with a speed, in particular of the traction drive or of the mobile working machine.

It is also found that the control device can be used in a flexible fashion also in other models or types if the standardized characteristic diagram, including the characteristics of various types of models, are stored therein. The applicant therefore retains the right to direct a patent application or a main claim to a control device that is configured in such a way for a traction drive of a mobile working machine.

In order to specifically control the traction drive, in one development a setpoint value of the setpoint driving behavior can be acquired from the standardized characteristic diagram by means of the control device by operating with a, in particular fixed, characteristic. This is done, e.g. in the case of the characteristic of the traction force, by a multiplication.

This setpoint value can preferably be transferred to a controller of the traction drive by means of which one or more machine setpoint values for actuating the working machine and/or at least one of the hydraulic machines can be acquired from the setpoint value in accordance with a control strategy which is stored for the implementation.

In one development, the characteristic diagram of the setpoint driving behavior contains, at least for the stationary state, a setpoint traction force which is parameterized in accordance with the driving request.

In one development, the characteristic diagram of the setpoint driving behavior contains, for at least one value of a loading force, a setpoint final speed which is parameterized in accordance with the driving request.

In one development, the characteristic diagram of the setpoint driving behavior contains, for at least one value of a driving request, a loading force sensitivity.

In one development, this loading force sensitivity is a speed change which is parameterized in accordance with a loading force change.

In one development, the characteristic diagram of the setpoint driving behavior, in particular a respective curve of the last-mentioned setpoint traction force, setpoint final speed and/or loading force sensitivity, can be or is stored in such a way having been divided in a parameterized fashion into driving ranges, in particular speed ranges. In this way, different driving ranges—for example a work journey at a low speed or a relocation journey at a high speed—can be parameterized differently.

Driving behavior which can be tracked particularly well by an operator is produced if, in one development, the setpoint driving behavior has, in each of the driving ranges, a constant gradient, with respect to the driving request and/or the speed.

A mobile working machine has according to the disclosure a hydrostatic traction drive which is configured according to at least one aspect of the present description.

A method for supplying data to an electronic computing device, in particular a control device of a hydrostatic traction drive which is provided for a mobile working machine and which is configured according to at least one aspect of the preceding description, is characterized by at least one of the steps of standardizing the characteristic diagram of the setpoint driving behavior, storing the standardized characteristic diagram of the setpoint driving behavior, and acquiring a setpoint value of the setpoint driving behavior from the standardized characteristic diagram by operating with (e.g. multiplying by) the at least one characteristic.

In one development, the last-mentioned step has at least the step of evaluating the standardized characteristic diagram using actual values of the driving request and of the speed.

In one development, the method has the step of transferring the setpoint driving behavior to another type of the traction drive or of the working machine or to another model of the same type by using the at least one, in particular fixed, characteristic of the other type or of the other model to descale the characteristic diagram.

The method or at least one section of the method can be stored in a computing unit and/or storage unit which is provided "offboard" of the traction drive or of the mobile working machine, for example for use within a development process of a development division, for implementation. Alternatively or additionally, each section of the method can, of course, be stored in the electronic control device or some other control unit of the traction drive or of the mobile working machine according to the present description for implementation.

An exemplary embodiment of a mobile working machine according to the disclosure having a hydrostatic traction drive and exemplary embodiment of a method according to the disclosure for supplying data with respect to a setpoint driving behavior are illustrated in the drawings. The disclosure will now be explained in more detail with reference to these drawings.

DETAILED DESCRIPTION

Figure 1:
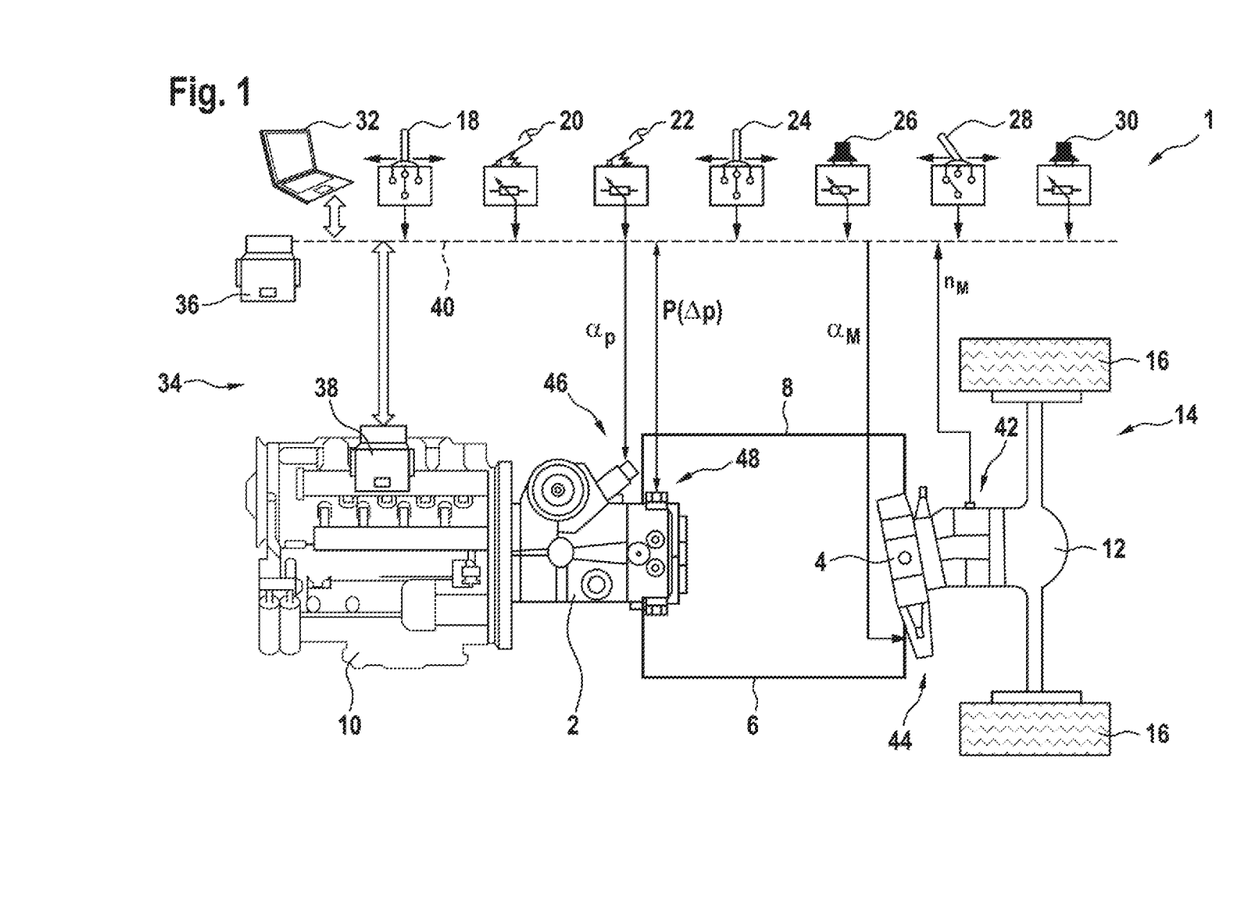
FIG. 1 shows a schematic, hydraulic circuit diagram of a mobile working machine according to the disclosure.

According to FIG. 1, a type of a mobile working machine 1 has the following design which remains constant over its possible model variants AMn: the working machine 1 has a hydrostatic transmission with a first hydraulic machine 2 which is configured as an axial piston pump of a swashplate design and with adjustable displacement volume, and a second hydraulic machine 4 which is configured as an axial piston motor of a swashplate design. The latter is also configured with adjustable displacement volume.

Both hydraulic machines 2, 4 are fluidly connected in a closed hydraulic circuit via working lines 6, 8. In order to drive the first hydraulic machine 2, the latter is coupled to a drive machine 10 which is configured as diesel engine. The second hydraulic machine 4 is coupled to a differential 12 of an output axle 14 with two tires 16.

In order to operate the hydrostatic traction drive and to transmit driver's requests, the mobile working machine 1 has a multiplicity of operator control elements. The latter are a travel direction switch 18, a brake pedal 20, an accelerator pedal 22, a driving mode selection switch 24, a speed-limiting switch 26 and 28, as well as a manual throttle 30. Moreover, a service interface 32 is provided.

Furthermore, the mobile working machine 1 has an electronic control device 34 for controlling. Said control device 34 comprises a main control unit 36, an engine/motor control unit 38 of the driving machine 10 and a CAN bus 40 via which the operator control elements 18 to 30, the service interface 32 and the control device 34 are connected in a signal-transmitting fashion.

The mobile working machine 1 can be of a different machine type. It can therefore be configured, for example, as a wheel loader, teleloader, stacker or the like. In this context, the described design is conceivable for different models of the type. The models can differ, in particular in respect of different power classes and/or speed ranges. That is to say they have, as a characteristic, for example a different maximum vehicle speed and/or maximum available power for the traction drive and/or maximum available traction drive traction force. These different properties or characteristics of the types or models of the mobile working machine 1 are allowed for according to the disclosure by means of type-specific and/or model-specific, standardized parameterization in the control device 34, which is explained in the text which follows.

According to FIG. 1, the mobile working machine 1 has a rotational speed-sensing unit 42 via which a rotational speed $n_M$ of the second hydraulic machine 4 can be sensed and can be reported to the main control unit 36 via the CAN bus 40. In this context, parameters of the mobile working machine 1, to be more precise the specific type and model thereof are stored in the main control unit 36, by means of which parameters a speed $v_{ist}$ of the mobile working machine 1 can be acquired from the rotational speed $n_M$. The specified parameters are, in particular, a transmission ratio of the differential 12 and circumferences of the wheels 16.

The second hydraulic machine 4 also has an adjustment device 44 which is connected in a signal-transmitting fashion to the CAN bus 40 and via the latter to the main control unit 36. By means of said adjustment device 44, the main control unit 36 can control a pivoting angle $\alpha_M$, and therefore the displacement volume of the second hydraulic machine 4. The same applies to an adjustment device 46 of the first hydraulic machine 2 and the pivoting angle $\alpha_p$ thereof. The mobile working machine 1 also has a pressure-sensor unit 48 by means of which a working pressure p in the working lines 6, 8 and/or a pressure difference $\Delta p$ between the working lines 6, 8 can be sensed and transmitted to the CAN bus 40.

Figure 2:
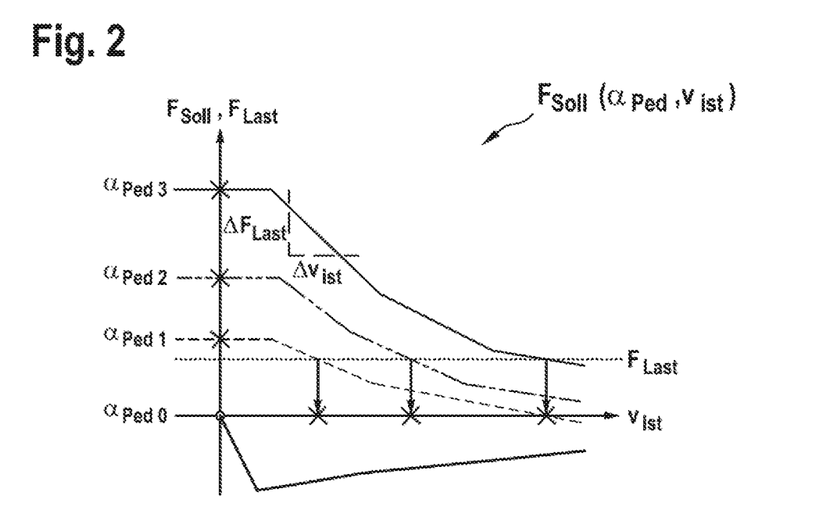
FIGS. 2, 3, 4 show a characteristic diagram of a setpoint driving behavior, parameterized in accordance with a speed and a driver's request, of the mobile working machine according to FIG. 1.
Figure 3:
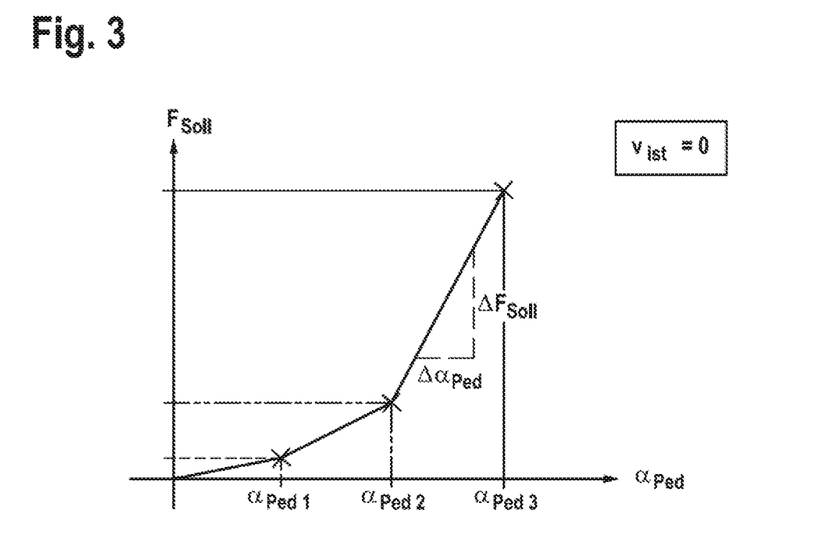
Figure 4:
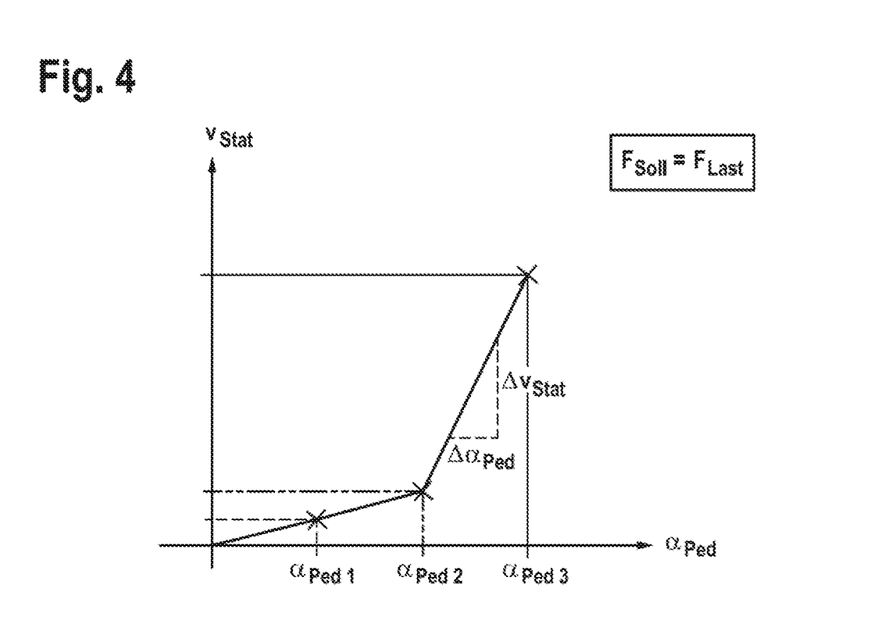

FIGS. 2 to 4 show a non-standardized characteristic diagram $F_{soll}(\alpha_{Ped}, v_{ist})$ of a setpoint driving behavior of the mobile working machine 1 according to FIG. 1. FIG. 2 shows the entire characteristic diagram $F_{soll}(\alpha_{Ped}, v_{ist})$, wherein a setpoint traction force $F_{soll}$ is illustrated here, as a criterion for the setpoint driving behavior, in accordance with the speed $v_{ist}$ of the mobile working machine 1 and the driving request $\alpha_{Ped}$ transmitted by the accelerator pedal 22, that is to say the pedal angle of said accelerator pedal 22. For different pedal angles $\alpha_{Ped}$, the profile of the setpoint traction force $F_{soll}$ is stored parameterized in accordance with the speed $v_{ist}$. The parameterization produces the desired setpoint driving behavior. The upper three curves $\alpha_{Ped1}$ to $\alpha_{Ped3}$ according to FIG. 2 represent here a traction mode, and the curve illustrated underneath the $v_{ist}$ axle represents an overrun mode of the mobile working machine 1. In addition, an exemplary negative load $F_{Last}$ is included as a horizontal-dashed line. The profile of the setpoint traction force $F_{soll}$ is divided into driving regions, as a measure of a setpoint driving behavior for each pedal position $\alpha_{Ped}$. These driving regions are each characterized by a linear function with the gradient $\Delta\alpha_{Ped}/\Delta v_{ist}$. This gradient $\Delta\alpha_{Ped}/\Delta v_{ist}$ represents, as a criterion of the setpoint driving behavior, a so-called load sensitivity, that is to say a relationship between a loading force change and a speed change resulting therefrom.

FIG. 3 shows, as a criterion for the setpoint driving behavior, a force buildup of the setpoint traction force $F_{soll}$ in accordance with the position of the accelerator pedal $\alpha_{Ped}$, and specifically for a speed of $v_{ist}=0$. This case is given, for example, if a towing working machine is to tow a heavy vehicle. The steeper the force buildup here the greater the risk of a cable rupture. In order to avoid such a case, according to FIG. 3 the setpoint traction force $F_{soll}$ initially rises only very gently to the right with a rising accelerator pedal angle $\alpha_{Ped}$.

FIG. 4 shows, as a criterion for the setpoint driving behavior, a rise in the maximum or steady-state speed $v_{stat}$, occurring in the force equilibrium $F_{soll}=F_{zug}=F_{Last}$, in accordance with the accelerator pedal angle $\alpha_{Ped}$.

As already mentioned, both diagrams in FIGS. 3 and 4 are contained in the characteristic diagram $F_{soll}(v_{ist}, \alpha_{Ped})$ according to FIG. 2.

Figure 5:
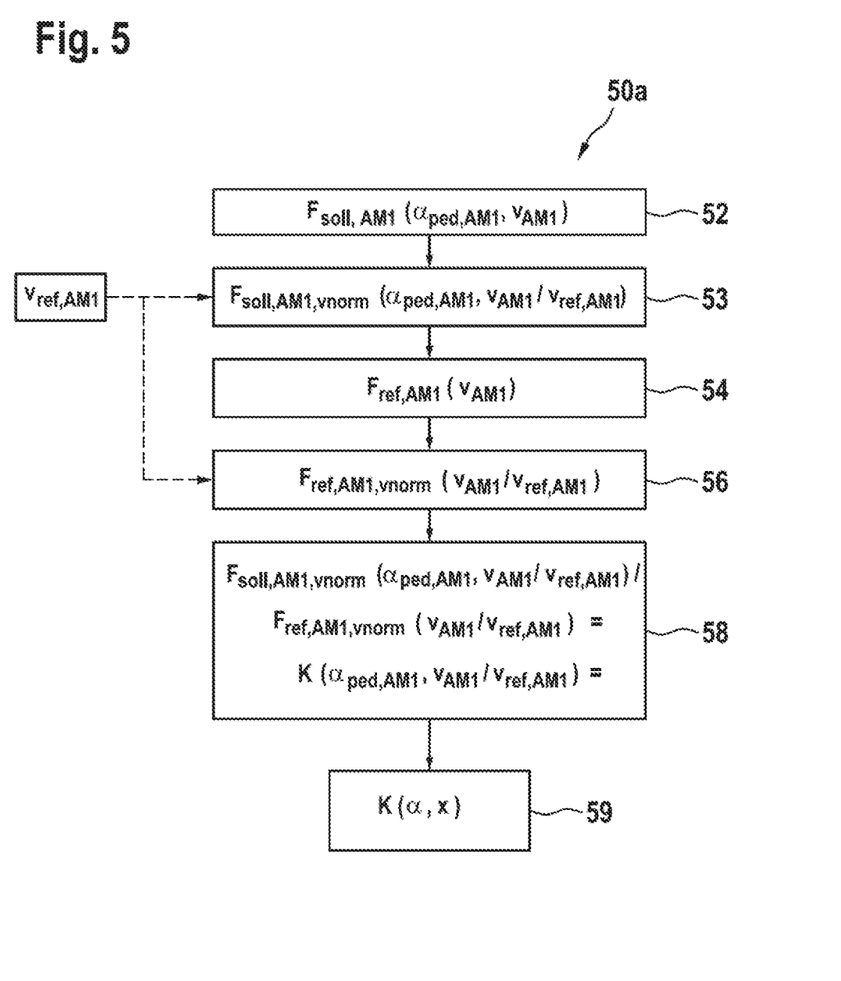
FIG. 5 shows a block diagram of a first section of the method according to the disclosure for supplying data, in which section the characteristic diagram of a model or type of a mobile working machine is standardized.

FIG. 5 shows a block diagram of an exemplary embodiment of a method 50 for supplying data, wherein initially a first section 50a of the method is illustrated in which standardization of the already mentioned characteristic diagram takes place by means of characteristics of a first type and model, indicated by AM1, of the mobile working machine 1.

Figure 6:
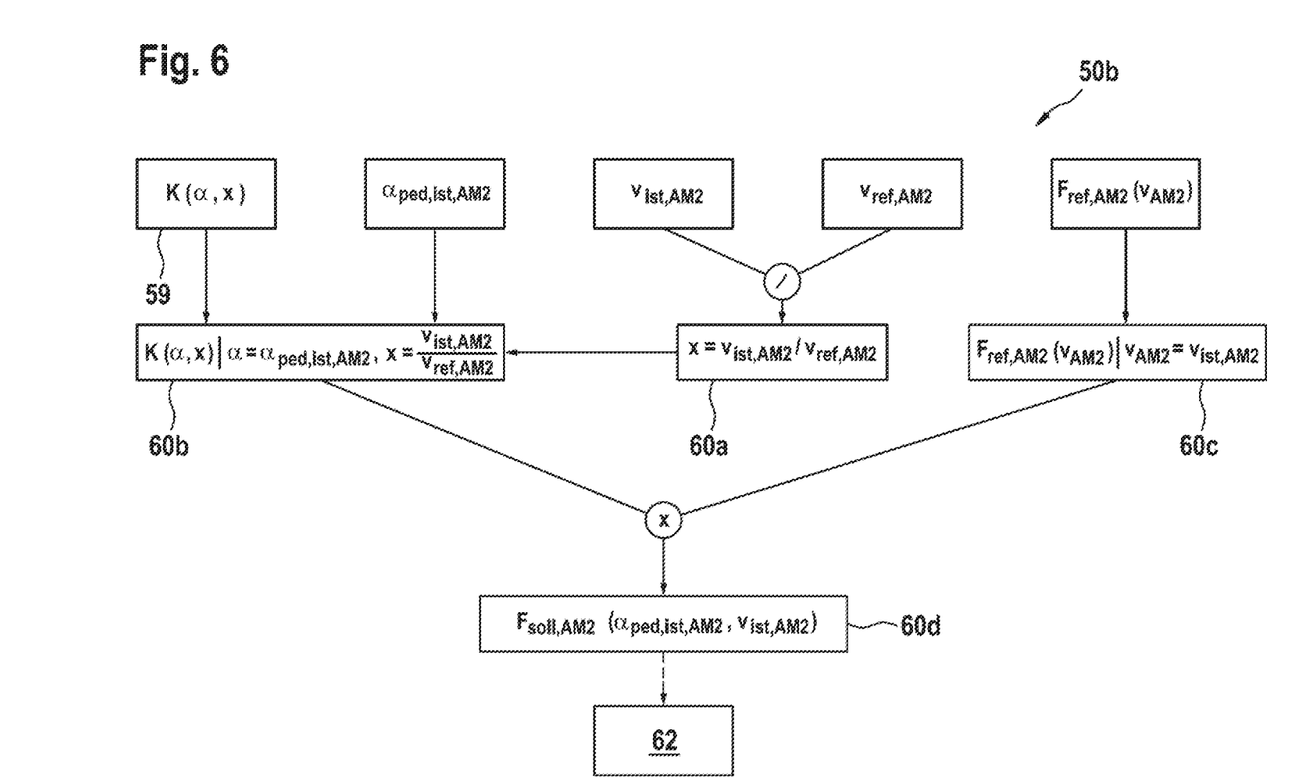
FIG. 6 shows a block diagram of a section of the method according to the disclosure for supplying data, in which section a control device of a second model of the mobile working machine according to FIG. 1 is supplied with data.

FIG. 6 then describes the following section 50b of the method in which the setpoint driving behavior, which is described via the abovementioned standardized characteristic diagram, is transferred onto a second model, indicated by AM2, of the same type of the mobile working machine 1.

The standardization section 50a of the method according to FIG. 5 is preferably stored in a computing and/or storage unit which is provided "offboard" of the mobile working machine, for example for use within a development process of a development division, for implementation. Alternatively or additionally, each section of the method 50 can, of course, be stored in the electronic control device 34 or another control unit of the mobile working machine 1.

According to FIG. 5, the characteristic diagram of the setpoint traction force $F_{Soll,AM1}$ is selected for the description of the setpoint driving behavior of the first model and type AM1 of the working machine 1, which setpoint traction force $F_{Soll,AM1}$, is, according to method step 52, parameterized in such a way that it can be derived from the rotational speed $n_M$ of the second hydraulic machine 4 in accordance with the driving request $\alpha_{Ped,AM1}$ and the speed $v_{AM1}$. The maximum achievable speed $v_{ref,AM1}$ of the first model and type AM1 is input into the method as fixed characteristic thereof. By division by $v_{ref,AM1}$, the standardization of the speed variable $v_{AM1}$ is carried out in the method step 53 so that the speed axis $v_{AM1}/v_{ref,AM1}$ of the setpoint traction force $F_{Soll,AM1,vnorm}$ which is represented in this way is dimensionless. According to a method step 54, a suitable characteristic is selected as a reference for the setpoint traction force $F_{Soll,AM1,vnorm}$—In the exemplary embodiment shown this is a reference force $F_{ref,AM1}$ which is described as a function of the variable speed $v_{AM1}$. For example, the function of a maximum achievable traction force $F_{max}(v_{AM1})$ of the first model and type AM1 of the working machine 1 is suitable as a reference force. In step 56, as already for the setpoint traction force, the variable $v_{AM1}$ is also standardized to the fixed characteristic $v_{ref,AM1}$ for the reference force $F_{ref,AM1}$. Therefore, the characteristic $F_{ref,AM1,vnorm}$ is then also described and stored in accordance with the standardized variable $v_{AM1}/v_{ref,AM1}$. In the next step

58, a standardized characteristic diagram $K(\alpha_{Ped,AM1}, v_{AM1}/v_{ref,AM1})$ is produced by referring the characteristic diagram $F_{Soll,AM1,vnorm}$ to the characteristic $F_{ref,AM1,vnorm}$. In a general type-independent and model-independent notation there results from this in step 59 according to FIG. 5 the standardized characteristic diagram $K(\alpha,x)$ which is the basis for the following section 50b of the method according to the disclosure according to FIG. 6 in which the setpoint driving behavior of the first model AM1 of the working machine 1 is transferred onto a second model AM2 of the same type of the working machine 1 and is used to control the traction drive.

This following section is preferably stored in the control device 34 of the model AM2 of the mobile working machine 1, that is to say the "onboard", for implementation.

According to FIG. 6 input variables of this following step of the method are: the standardized characteristic diagram $K(\alpha,x)$, the characteristics $v_{ref,AM2}$ and $F_{ref,AM2}(v_{AM2})$ of the model AM2 and the variables $\alpha_{ped,AM2}$ and $v_{AM2}$ which have been sensed and/or acquired in the driving mode of this model. In the driving mode of the model AM2 of the mobile driving machine 1, the electronic control device 34 continuously acquires the actual speed $v_{ist,AM2}$ from the rotational speed $n_M$. At the same time, it obtains the driver's driving request $\alpha_{Ped,ist,AM2}$ as a specification of said driver. With these inputs and with knowledge of the characteristics $v_{ref,AM2}$ and $F_{ref,AM2}$ of the model AM2 it determines the actual setpoint traction force $F_{soll,AM2}(\alpha_{Ped,ist,AM2}, v_{ist,AM2})$. Initially, for this purpose in step 60a the standardized actual speed is determined by dividing $v_{ist,AM2}$ by the fixed characteristic $v_{ref,AM2}$. Subsequently, in step 60b, the standardized characteristic diagram $K(\alpha,x)$ is evaluated for the actual driver accelerator pedal position $\alpha=\alpha_{ped,ist,AM2}$ and the standardized actual speed $x=v_{ist,AM2}/v_{ref,AM2}$. In step 60c, the value of the characteristic $F_{ref,AM2}(v_{AM2})$ is evaluated for the actual speed $v_{ist,AM2}$. In the step 60d, according to FIG. 6 the actual dimensioned setpoint traction force $F_{soll,AM2}$ is acquired for the sensed actual values $\alpha_{ped,ist,AM2}$ and $v_{ist,AM2}$ by operating (multiplying) with the characteristic diagram evaluated in step 60b, with the characteristic diagram K which is evaluated in step 60b.

Figure 7:
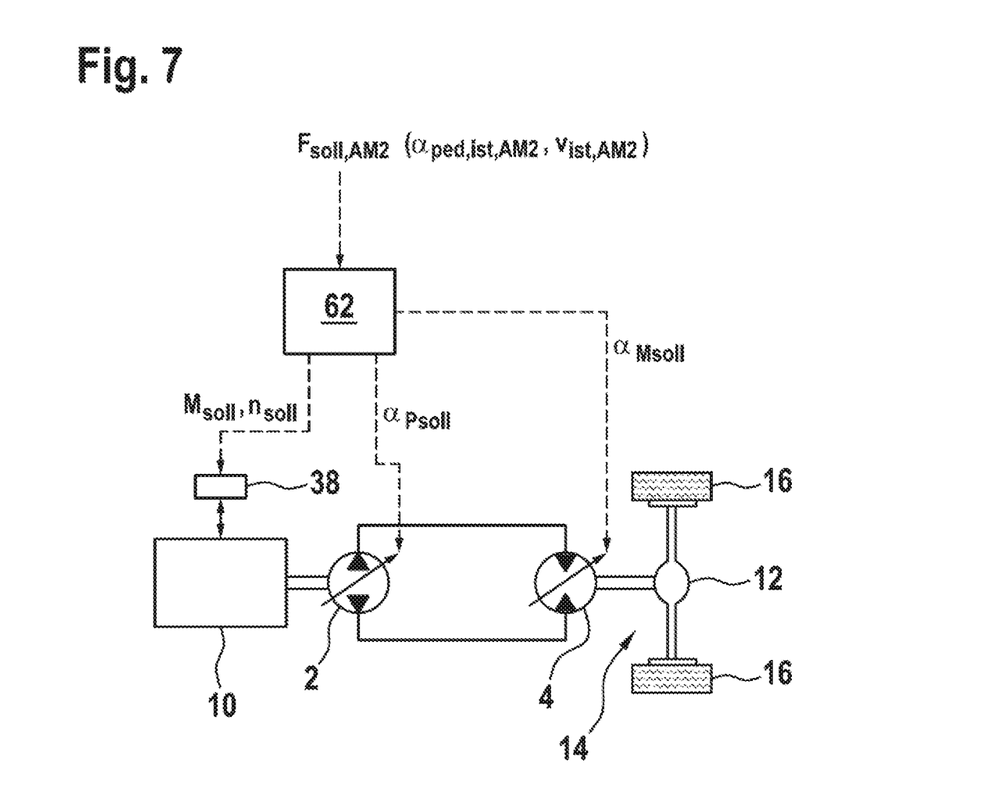
FIG. 7 shows the second model of the mobile working machine according to FIG. 1, activated with the setpoint traction force from the method according to FIG. 6.

This setpoint value $F_{soll,AM2}(\alpha_{ped,ist,AM2}, v_{ist,AM2})$ is input into a downstream controller 62 according to FIG. 7 by means of which—depending on the stored control strategy—setpoint values $\alpha_{Msoll}$, $\alpha_{Psoll}$ and $M_{soll}$, $n_{soll}$ are transmitted to the machines 2, 4 and 10. One of the two values, the setpoint torque $M_{soll}$ or preferably setpoint rotational speed $n_{soll}$, is transmitted here to the engine control unit 38 of the drive machine 10.

A hydrostatic traction drive is disclosed having a control device in which a setpoint driving behavior of the traction drive or of a mobile working machine for which this traction drive is provided is stored in a parameterized fashion. According to the disclosure, the setpoint driving behavior is stored, referred to a property or a, in particular fixed, characteristic of a type or of a model of the traction drive or of the drive machine, and as a result standardized.

Furthermore, a mobile working machine with such a hydrostatic traction drive is disclosed.

A method for supplying data to the control device is also disclosed, said method containing at least one of the steps of standardizing the setpoint driving behavior by means of the at least one, in particular fixed, characteristic, storing the standardized setpoint driving behavior or acquiring a setpoint value of the setpoint driving behavior from the standardized setpoint driving behavior by operating with (e.g. by multiplying by) the at least one, in particular fixed, characteristic.

What is claimed is:

1. A hydrostatic traction drive for a mobile working machine, comprising:
   a first hydraulic machine coupled to a drive machine;
   a second hydraulic machine arranged with the first hydraulic machine in a hydraulic circuit and coupled to an output; and
   an electronic control device storing a characteristic diagram of a setpoint driving behavior of the mobile working machine, the stored characteristic diagram is dimensionless with respect to at least one characteristic of the mobile working machine,
   wherein the electronic control device is configured to generate a dimensioned setpoint value using the stored characteristic diagram and at least one driving request.

2. The traction drive according to claim 1, wherein the electronic control device is further configured to generate the dimensioned setpoint using a speed of the traction drive or of the mobile working machine.

3. The traction drive according to claim 1, wherein:
   the stored characteristic diagram of the setpoint driving behavior maps a setpoint traction force; and
   the at least one characteristic of the mobile working machine is a speed-dependent maximum traction force of the traction drive or of the mobile working machine.

4. The traction drive according to claim 1, wherein the at least one characteristic of the mobile working machine is stored in the electronic control device.

5. The traction drive according to claim 1, wherein the setpoint value is acquired from the stored characteristic diagram of the setpoint driving behavior by the electronic control device by multiplying the stored characteristic diagram with the at least one characteristic of the mobile working machine.

6. The traction drive according to claim 1, wherein the stored characteristic diagram of the setpoint driving behavior contains, at least for a speed equal to zero, a setpoint traction which is parameterized using the at least one driving request.

7. The traction drive according to claim 1, wherein the stored characteristic diagram of the setpoint driving behavior includes, for at least one loading force, a setpoint final speed which is parameterized using the at least one driving request.

8. The traction drive according to claim 1, wherein the stored characteristic diagram of the setpoint driving behavior includes a loading force sensitivity.

9. The traction drive according to claim 8, wherein the loading force sensitivity includes, for the at least one driving request, a speed change which is parameterized in accordance with a loading force change.

10. The traction drive according to claim 1, wherein the stored characteristic diagram of the setpoint driving behavior is stored after having been divided in a parameterized fashion into a plurality of driving ranges.

11. The traction drive according to claim 10, wherein the stored characteristic diagram of the setpoint driving behavior has, in each drive range of the driving ranges, a constant gradient with respect to the at least one driving request and/or a speed of the mobile working machine.

12. A mobile working machine, comprising:
    a hydrostatic traction drive including
    a first hydraulic machine coupled to a drive machine, a second hydraulic machine arranged with the first hydraulic machine in a hydraulic circuit and coupled to an output, and an electronic control device storing a characteristic diagram of a setpoint driving behavior of the mobile working machine, the stored characteristic diagram is dimensionless with respect to at least one characteristic of the mobile working machine, wherein the electronic control device is configured to generate a dimensioned setpoint using the stored characteristic diagram and at least one driving request.

13. A method for supplying data to an electronic control device of a hydrostatic traction drive for a mobile working machine, comprising:

standardizing a characteristic diagram of a setpoint driving behavior of the mobile working machine such that the characteristic diagram is dimensionless with respect to at least one characteristic of the mobile working machine;

storing the standardized characteristic diagram of the setpoint driving behavior in the electronic control device of the hydrostatic traction drive; and acquiring with the electronic control device a setpoint value of the setpoint driving behavior using the stored standardized characteristic diagram by multiplying the stored standardized characteristic diagram with the at least one characteristic of the mobile working machine.

14. The method according to claim 13, further comprising:

transferring the setpoint driving behavior to another type of the traction drive or of the working machine or to another model of a same type of the working machine; and acquiring a further setpoint value for the other type of the traction drive or of the working machine or the other model of a same type of the working machine by multiplying the standardized characteristic diagram with at least one characteristic of the other type or of the other model, the at least one characteristic of the other type or of the other model is the same type characteristic as the at least one characteristic of the mobile working machine.

15. The method according to claim 13, further comprising:

parameterizing the characteristic diagram using at least one driving request, and evaluating the standardized characteristic diagram using actual values of the at least one driving request and a speed, prior to acquiring the setpoint value of the setpoint driving behavior using the stored standardized characteristic diagram.

* * * * *